(12) United States Patent
Ichikawa

(10) Patent No.: US 8,737,185 B2
(45) Date of Patent: May 27, 2014

(54) OPTICAL DISC DEVICE AND OPTICAL DISC REPRODUCTION METHOD

(71) Applicant: Funai Electric Co., Ltd., Osaka (JP)

(72) Inventor: Kazuhiro Ichikawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 13/890,342

(22) Filed: May 9, 2013

(65) Prior Publication Data

US 2013/0322226 A1     Dec. 5, 2013

(30) Foreign Application Priority Data

May 31, 2012  (JP) .................................. 2012-125187

(51) Int. Cl.
G11B 7/00     (2006.01)

(52) U.S. Cl.
USPC ...................... 369/116; 369/47.52; 369/47.53

(58) Field of Classification Search
None
See application file for complete search history.

(56) References Cited

U.S. PATENT DOCUMENTS

| | | | |
|---|---|---|---|
| 5,175,722 A * | 12/1992 | Minami et al. ................ | 369/116 |
| 6,731,584 B1 * | 5/2004 | Nagara ......................... | 369/47.5 |
| 7,406,012 B2 * | 7/2008 | Kamei ......................... | 369/53.26 |
| 8,270,277 B2 * | 9/2012 | Jin et al. ...................... | 369/53.27 |
| 2005/0286392 A1 | 12/2005 | Kamei | |
| 2006/0250918 A1 | 11/2006 | Hsu et al. | |
| 2008/0089203 A1 * | 4/2008 | Nishimura et al. ......... | 369/53.23 |
| 2009/0262624 A1 * | 10/2009 | Fukuhara ..................... | 369/94 |
| 2010/0110866 A1 * | 5/2010 | Takeshita et al. ............. | 369/116 |
| 2010/0226218 A1 * | 9/2010 | Nakamura et al. ........... | 369/47.5 |
| 2011/0110206 A1 | 5/2011 | Shiozawa | |
| 2011/0158068 A1 | 6/2011 | Minamiguchi et al. | |
| 2012/0134253 A1 | 5/2012 | Jin et al. | |

FOREIGN PATENT DOCUMENTS

| | | |
|---|---|---|
| CN | 102479523 A | 5/2012 |
| JP | 06-208728 A | 7/1994 |
| JP | 2001-236647 A | 8/2001 |
| JP | 2003-308624 A | 10/2003 |
| JP | 2007-172689 A | 7/2007 |
| WO | 2007-096834 A1 | 8/2007 |
| WO | 2007-145124 A1 | 12/2007 |

OTHER PUBLICATIONS

Extended European Search Report of the Corresponding European Application No. 13168036.5, dated Sep. 30, 2013.

* cited by examiner

*Primary Examiner* — Thang Tran
(74) *Attorney, Agent, or Firm* — Global IP Counselors, LLP

(57) ABSTRACT

An optical disc device is configured to reproduce an optical disc. The optical disc device includes an optical pickup and a driver. The optical pickup has a laser irradiation component that is configured to emit a laser beam to the optical disc for obtaining a return light. The driver is configured to generate a drive signal for driving the laser irradiation component based on a high-frequency signal. The driver is further configured to set an amplitude of the high-frequency signal used while reproducing a test region of the optical disc to be different from an amplitude of the high-frequency signal used while reproducing a data region of the optical disc. The test region of the optical disc is reproduced to acquire a setting signal for a setup of the optical pickup.

10 Claims, 3 Drawing Sheets

Change in Output Level of Laser Beam
in Test Recording Mode

Drive Signal Wave Form

OPTICAL DISC DEVICE AND OPTICAL DISC REPRODUCTION METHOD

CROSS-REFERENCE TO RELATED APPLICATIONS

This application claims priority to Japanese Patent Application No. 2012-125187 filed on May 31, 2012. The entire disclosure of Japanese Patent Application No. 2012-125187 is hereby incorporated herein by reference.

BACKGROUND

1. Field of the Invention

The present invention generally relates to an optical disc device. More specifically, the present invention relates to an optical disc device for recording and reproducing an optical disc. Furthermore, the present invention relates to an optical disc reproduction method.

2. Background Information

There are conventional optical disc devices that reproduce data recorded to a Blu-ray Disc, DVD, or other such optical disc. With such an optical disc device, an optical pickup emits a laser beam on the optical disc, and reproduction and so forth are performed using a signal reproduced based on return light (see Japanese Laid-Open Patent Application Publication No. 2007-172689 (Patent Literature 1), for example).

During writing of the optical disc device, the output of the laser beam emitted from the optical pickup is raised over than the output of the laser beam used during reproduction. For example, the change in the output of the laser beam during writing and reproduction is accomplished by producing a drive signal used for driving a semiconductor laser so that a high-frequency signal is superposed (see Japanese Laid-Open Patent Application Publication Nos. 2001-236647 (Patent Literature 2) and H6-208728 (Patent Literature 3), for example). Furthermore, other conventional optical disc devices are also known (see Japanese Laid-Open Patent Application Publication No. 2003-308624 (Patent Literature 4), for example).

SUMMARY

With an optical disc, besides a region in which data is recorded, there is also a test region for making various settings for the optical pickup. OPC (optimum power control) is an example of setting by using the test region. With OPC, the laser output is controlled to the optimal power. It has been discovered that, if reproduction quality is poor in the test region, the optical pickup will not be set up properly, which is undesirable.

One object of the present disclosure is to provide an optical disc device that improves reproduction of the test region.

In view of the state of the know technology, an optical disc device is configured to reproduce an optical disc. The optical disc device includes an optical pickup and a driver. The optical pickup has a laser irradiation component that is configured to emit a laser beam to the optical disc for obtaining a return light. The driver is configured to generate a drive signal for driving the laser irradiation component based on a high-frequency signal. The driver is further configured to set an amplitude of the high-frequency signal used while reproducing a test region of the optical disc to be different from an amplitude of the high-frequency signal used while reproducing a data region of the optical disc. The test region of the optical disc is reproduced to acquire a setting signal for a setup of the optical pickup.

Other objects, features, aspects and advantages of the present disclosure will become apparent to those skilled in the art from the following detailed description, which, taken in conjunction with the annexed drawings, discloses selected embodiments of an optical disc device and an optical disc reproduction method.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
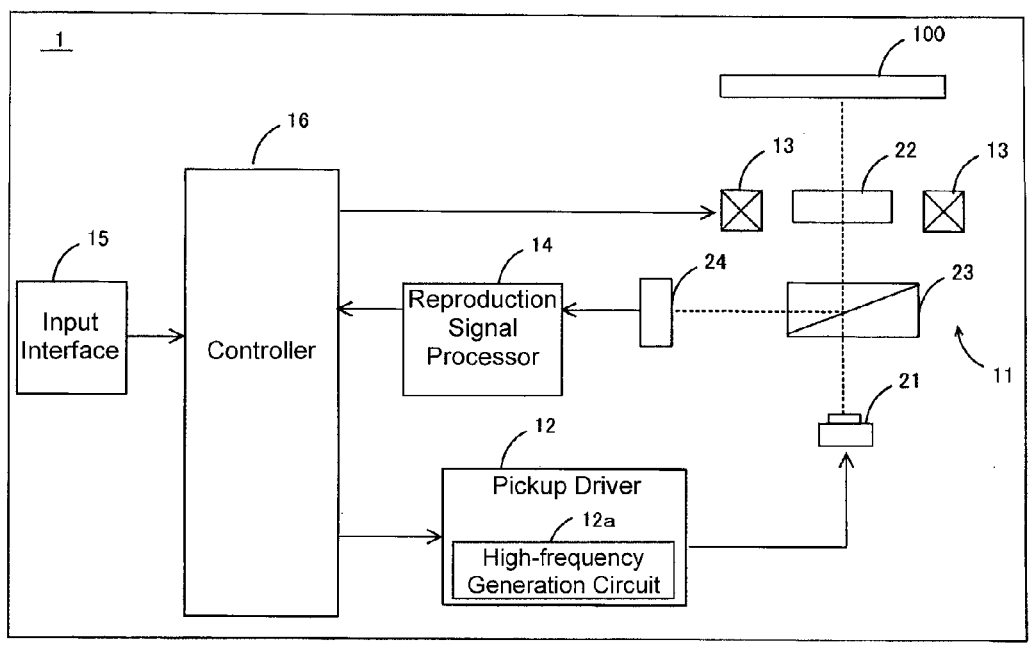
FIG. 1 is a block diagram of an overall configuration of an optical disc device in accordance with one embodiment.

Referring initially to FIG. 1, an optical disc device 1 is illustrated in accordance with one embodiment of the present disclosure. FIG. 1 is a block diagram of an overall configuration of the optical disc device 1.

The optical disc device 1 is configured to record television broadcast data to an optical disc 100, such as a Blu-ray Disc, a DVD or any other optical disc. The optical disc device 1 is also configured to reproduce data recorded to the optical disc 100, and output this data to an external device (not shown) connected to the optical disc device 1.

As shown in FIG. 1, the optical disc device 1 includes an optical pickup 11, a pickup driver 12, a position controller 13, a reproduction signal processor 14, an input interface 15, and a controller 16.

The optical pickup 11 further includes a semiconductor laser 21 (e.g., laser irradiation component) 21, an object lens 22, a polarizing beam splitter 23, and a light receiver 24. The semiconductor laser 21 is configured to emit a laser beam. The object lens 22, the polarizing beam splitter 23 and the light receiver 24 form an optical system that defines an optical path of the laser beam. The semiconductor laser 21 oscillates at a specific period or frequency according to a drive signal, and emits the laser beam. The object lens 22 and the polarizing beam splitter 23 guide the laser beam emitted from the semiconductor laser 21 to the optical disc 100, and also guide the return light formed by reflection of the laser beam off the optical disc 100 to the light receiver 24. In the illustrated embodiment, the semiconductor laser 21 is used as an example of the laser irradiation component. However, the optical pickup 11 can include any other suitable laser irradiation components.

The reproduction signal processor 14 demodulates a control signal and a reproduction signal RF obtained based on the return light received by the optical pickup 11. The reproduction signal processor 14 subjects the demodulated reproduction signal RF to error correction processing.

The controller 16 performs overall control of the drive of the optical disc device 1. As an example of this control, the controller 16 produces a tracking error signal TE and a focus error signal FE based on the control signal outputted from the reproduction signal processor 14, and outputs these to the position controller 13. An identification signal is produced according to the type of an optical disc to be reproduced (e.g., the type of the optical disc 100 in this embodiment). The controller 16 also produces a switching signal according to the mode executed by the optical disc device 1.

The position controller 13 performs a position control of the object lens 22 based on the tracking error signal TE and the focus error signal FE. The position controller 13 includes a two-axis actuator that changes the position of the object lens 22. The position controller 13 also performs a tracking control by which the object lens 22 is made to follow the track of the optical disc 100 based on the tracking error signal TE. The position controller 13 also performs a focus control by which the focal distance of the object lens 22 is adjusted based on the focus error signal FE.

The input interface 15 is, for example, a tuner that acquires television broadcast signals. The data acquired by the input interface 15 is written by the optical pickup 11 to the optical disc 100.

The pickup driver 12 (e.g., driver) produces the drive signal for driving the semiconductor laser 21. This drive signal is produced by high frequency current superposition. In the high frequency current superposition, the drive signal is produced by superposing a high-frequency signal over an original drive signal (hereinafter referred to as a reference signal), to aim for reducing noise in the return light. Therefore, the pickup driver 12 includes a high-frequency generation circuit 12a for producing or generating the high-frequency signal. The high-frequency generation circuit 12a produces the high-frequency signal according to the identification signal and the switching signal sent from the controller 16.

Figure 2A:
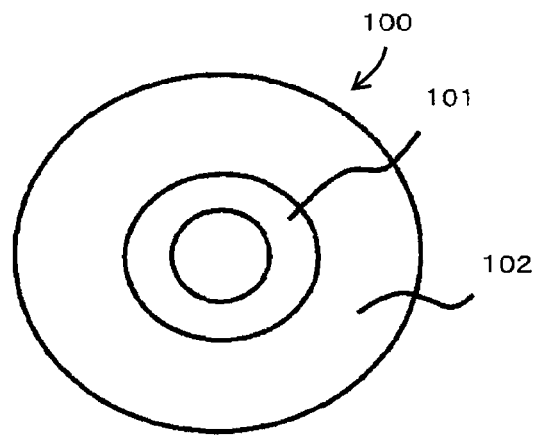
FIG. 2A is a schematic diagram of an optical disc utilized with the optical disc device illustrated in FIG. 1.
Figure 2B:
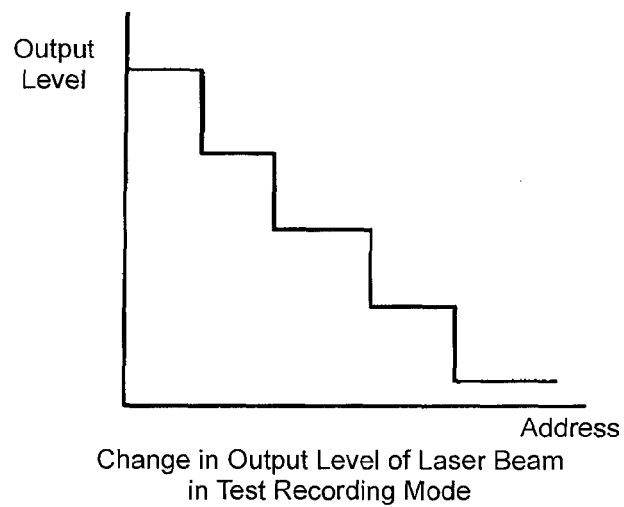
FIG. 2B is a schematic graph illustrating a change in an output level of a laser beam used in a test recording mode of the optical disc device illustrated in FIG. 1.
Figure 2C:
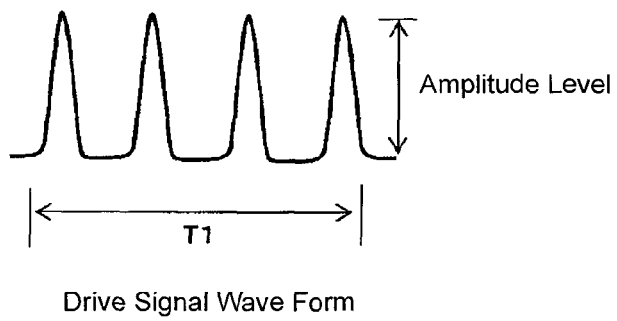
FIG. 2C is a schematic wave form of a drive signal for driving a semiconductor laser of the optical disc device illustrated in FIG. 1.

Next, the operating modes of the optical disc device 1 will be described. The optical disc device 1 has four operating modes as follows: a test recording mode, a test reproduction mode, a write mode, and a reproduction mode. Referring to FIGS. 2A, 2B and 2C, these various modes of the optical disc device 1 will be described in detail.

In the test recording mode, recording marks (data) are written to a test region 101 of the optical disc 100 shown in FIG. 2A. The test region 101 is a region for a test recording. As shown in FIG. 2B, in this test recording mode, the recording marks are formed by changing the output level of the laser beam in multiple stages according to specific addresses. In other words, the output level of the laser beam used in the test recording mode varies stepwise according to addresses of the test region 101 of the optical disc 100. The setting signal of the present application is acquired by reproducing these recording marks.

In the test reproduction mode, the test region 101 is reproduced. Specifically, the reproduction signal RF, the tracking error signal TE, and the focus error signal FE are acquired by reproducing the test region 101. The reproduction signal RF obtained by reproducing the test region 101 here is used for setting the output level of the laser beam used in the write mode, as discussed below. The tracking error signal TE and the focus error signal FE are used to control the position of the object lens 22.

In the write mode, the recording marks are formed in a data region 102 of the optical disc 100 by using the output level of the laser beam set through the test recording mode. The data region 102 is a region for normal data recording, and is different from the test region 101. Therefore, data acquired through the input interface 15 is recorded to this data region 102. In the reproduction mode, the optical pickup 11 is made to follow the track of the optical disc 100, and the recording marks recorded in the data region 102 are reproduced.

As discussed above, the recording marks formed in the test region 101 are formed by changing the output level of the laser beam in multiple stages, so there can be cases when there is a drop in reproduction quality of the signal obtained based on the return light. The reproduction quality can similarly drop if there are defects, scratches, or the like on the recording side of the optical disc 100. If the reproduction quality suffers, then the signal quality of the tracking error signal TE and the focus error signal FE produced based on the return light will also suffer, so tracking error or focus error can occur in the optical pickup 11.

As shown in FIG. 2C, the output level of the laser beam, which affects the reproduction quality, is found from the average amplitude level of the drive signal at a certain time period T1. With the high frequency current superposition, the output level of the drive signal can be varied by changing the amplitude level of the high-frequency signal that is superposed. If the output level of the laser beam is high, however, it is conceivable that the recording marks can be degraded by irradiation with the laser beam. On the other hand, the test reproduction mode is used only for deciding on the output level of the laser beam. Thus, degradation of the recording marks recorded in the test region 101 will not affect the reproduction mode. In view of this, with the optical disc device 1 of the present application, the reproduction quality of the test region 101 is improved by having the amplitude level of the high-frequency signal superposed with the pickup driver 12 in the test reproduction mode be different from the amplitude level of the high-frequency signal used during the reproduction mode. For example, in the illustrated embodiment, the amplitude level of the high-frequency signal superposed with the pickup driver 12 in the test reproduction mode is set to be higher than the amplitude level of the high-frequency signal used during the reproduction mode.

Figure 3:
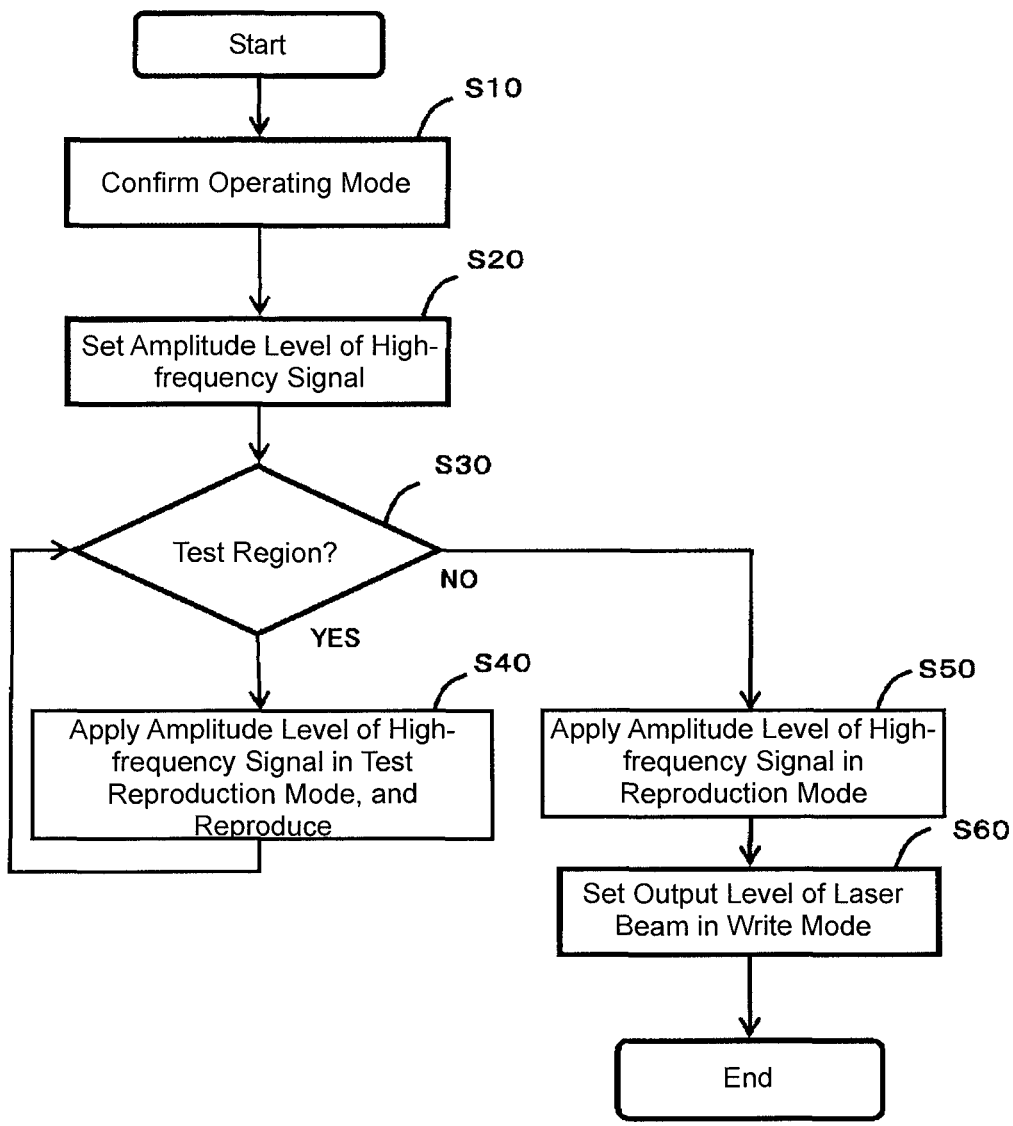
FIG. 3 is a flowchart illustrating a process for setting the output level of the laser beam used in a write mode of the optical disc device illustrated in FIG. 1.

FIG. 3 is a flowchart illustrating a process for setting the output level of the laser beam. The setting of the output level of the laser beam performed with the optical disc device 1 will be described through reference to FIG. 3. FIG. 3 shows processing in the test recording mode from step S10 to S40.

In step S10, the controller 16 determines whether or not the operation mode currently being executed is the test recording mode to confirm the operation mode.

In step S20, the controller 16 sets the amplitude level of the high-frequency signal used in the test recording mode. The setting of the amplitude level of the high-frequency signal is performed by the controller 16 by outputting the identification signal and the switching signal to the pickup driver 12. Upon receiving the identification signal and the switching signal, the pickup driver 12 starts producing the high-frequency signal corresponding to the test recording mode. In this embodiment, the high-frequency signal used in the test recording mode has a higher amplitude level than the high-frequency signal used in the reproduction mode. As an example of this, in the test recording mode, the high-frequency signal is used that has an amplitude level that is 2.4 to 3.8 times the amplitude level of the high-frequency signal used in the reproduction mode. The setting of the amplitude level of the high-frequency signal used in the reproduction mode can be performed in a conventional manner. Thus, detailed description of the setting of the amplitude level of the high-frequency signal will be omitted for the sake of brevity.

Furthermore, the amplitude level of the high-frequency signal used in the test recording mode can be set to be higher than the amplitude level of the high-frequency signal used in the reproduction mode as mentioned above. For example, the amplitude level of the high-frequency signal used in the test recording mode can be set to be 2.4 to 3.8 times the amplitude level of the high-frequency signal used in the reproduction mode in accordance with the identification signal indicative of the type of the optical disc 100 and the switching signal indicative of the operating mode of the optical disc device 1. Of course, the amplitude level of the high-frequency signal used in the test recording mode can be set in a different manner.

In step S30, the controller 16 drives the optical pickup 11 and searches for the test region 101. If the optical pickup 11 finds the test region 101 ("Yes" in step S30), the reading of the test region 101 is executed in step S40. Specifically, the pickup driver 12 produces the drive signal by superposing the high-frequency signal produced for reproduction of the test region 101 over the reference signal. The pickup driver 12 then drives the semiconductor laser 21 based on the drive signal thus produced, and emits the laser beam. In other words, the pickup driver 12 applies the amplitude level of the high-frequency signal in the test reproduction mode, and reproduces the test region 101. Therefore, the return light with reduced noise (return light noise) is emitted from the test region 101 and incident on the light receiver 24 of the optical pickup 11.

The above-mentioned reproduction of the test region 101 is executed until searching through the test region 101 by the optical pickup 11 is completed ("No" in step S30).

Meanwhile, if searching for the test region 101 by the optical pickup 11 ends ("No" in step S30), in step S50 the controller 16 changes the switching signal and changes the high-frequency signal to the amplitude level used in the reproduction mode. In other words, the pickup driver 12 applies the amplitude level of the high-frequency signal in the reproduction mode, and reproduces the data region 102. This is so that the recording marks recorded in the data region 102 will not be degraded by the laser beam. Steps S10 to S30 above correspond to a drive step of the present application for generating the drive signal. Step S40 corresponds to a pickup step of the present application for driving the semiconductor laser 21 (e.g., laser irradiation component).

In step S60, the controller 16 sets the output level of the laser beam in the write mode based on the return light received by the light receiver 24. As an example, the controller 16 acquires at each address the ratio (β value) between the bottom value and the peak value in the reproduction signal RF obtained by reproducing the return light. The output level of the laser beam used in reproducing the address at which the β value is optimal is set as the output level of the laser beam to be used in the write mode.

As described above, in this embodiment the reproduction quality in the test reproduction mode can be improved by changing the amplitude of the superposed high-frequency signal in the test reproduction mode. Specifically, the setting of the output level of the laser beam and the control of the object lens in the test reproduction mode can be better optimized.

In the illustrated embodiment, the setting of the output of the laser beam and the adjustment of the optical system are performed based on the data recorded to the test region 101. However, the present invention is not limited to these examples. Specifically, the present invention can also be applied to any case of setting the optical pickup 11.

In the illustrated embodiment, the amplitude level of the superposed high-frequency signal in the test reproduction mode is raised with respect to the amplitude level of the high-frequency signal in the reproduction mode. However, the present invention is not limited to this. Alternatively, the amplitude level of the high-frequency signal in the test reproduction mode can instead be lowered relative to the high-frequency signal in the reproduction mode.

Furthermore, besides the constitution of the illustrated embodiment, the optical disc device can be a portable terminal, a display device equipped with a display component, or the like.

With the optical disc device 1, the optical disc device 1 is configured to reproduce the optical disc 100. The optical disc device 1 has the optical pickup 11 and the pickup driver 12 (e.g., driver). The optical pickup 11 uses the semiconductor laser 21 (e.g., laser irradiation component) to emit the laser beam at the optical disc 100 and thereby obtain the return light. The pickup driver 12 generates the drive signal for driving the semiconductor laser 21 based on the high-frequency signal. The pickup driver 12 sets the amplitude of the high-frequency signal used while reproducing the test region 101, which is a region for acquiring the setting signals used for the setup of the optical pickup 11, to be different from the amplitude of the high-frequency signal used while reproducing the data region 102 (e.g., during normal reproduction).

With the optical disc device 1, the pickup driver 12 produces the drive signal for driving the semiconductor laser 21 based on the high-frequency signal. The amplitude of the high-frequency signal in the reproduction of the test region 101 is set by the pickup driver 12 to be different from the amplitude of the high-frequency signal used during normal reproduction. The test region 101 is not the region for reproducing signals used in the normal reproduction. If the amplitude of the high-frequency signal is raised and the recording mark is degraded, for example, there will be no loss of reproduction quality during the normal reproduction. Therefore, reproduction quality in the test region 101 can be improved by changing the amplitude of the high-frequency signal during reproduction of the test region 101.

With the optical disc device 1, as an example of the constitution of the test region 101, the constitution can be such that the writing to the test region 101 is performed by the output of the laser beam that has been varied in multiple stages. In other words, the semiconductor laser 21 (e.g., laser irradiation component) is configured to emit the laser beam such that an output level of the laser beam is varied in multiple stages while writing to the test region 101 of the optical disc 100. With this optical disc device 1, reproduction quality can also be improved in the region where data has not been written at a uniform output level of the laser beam.

With the optical disc device 1, the constitution can also be such that the setting signal includes the reproduction signal RF for setting the output level of the laser beam. Furthermore, the optical disc device 1 includes the controller 16 for setting the output level of the laser beam based on the reproduction signal RF. With the optical disc device 1, the output level of the laser beam can be set stably.

With the optical disc device 1, the constitution can also be such that the setting signal includes the control signal for controlling the position of the optical system included in the optical pickup 11. Furthermore, the optical disc device 1 includes the position controller 13 for controlling the position of the optical system based on the control signal. With the optical disc device 1, the position of the optical system can be controlled stably.

Furthermore, with the optical disc device 1, the pickup driver 12 (e.g., driver) is configured to set the amplitude of the high-frequency signal used while reproducing the test region 101 of the optical disc 100 to be larger than the amplitude of the high-frequency signal used while reproducing the data region 102 of the optical disc 100. The pickup driver 12 (e.g., driver) is further configured to set an amplitude of the high-frequency signal used while writing to the test region 101 of the optical disc 100 to be larger than the amplitude of the high-frequency signal used while reproducing the data region 102 of the optical disc 100. The pickup driver 12 (e.g., driver) is further configured to set the amplitude of the high-frequency signal used while writing to the test region 101 of the optical disc 101 to be 2.4 to 3.8 times the amplitude of the high-frequency signal used while reproducing the data region 102 of the optical disc 100. The pickup driver (e.g., driver) is configured to generate the drive signal by superposing the high-frequency signal over a reference signal. The test region 101 of the optical disc 100 is a different region from the data region 102 of the optical disc 100.

The present invention can also be applied to a method (e.g., optical disc reproduction method) for reproducing the test region 101 in order to stabilize the reproduction quality of the optical disc 100.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

It should be apparent to those skilled in the art that the present invention is not limited to the embodiments given above, but the following modification can be made without departing from the scope of the invention: suitably combining and changing the mutually interchangeable members, configurations, and so forth disclosed in the above embodiments; suitably substituting or combining and changing the interchangeable member, configuration, and so forth disclosed in the above embodiments with those that are not disclosed in the above embodiment but are conventionally known; and suitably substituting or combining and changing the member, configuration, and so forth that are not disclosed in the above embodiments with those that are apparent modifications to those skilled in the art based on the conventionally known technique as replacements for the member, configuration, and so forth disclosed in the above embodiment.

What is claimed is:

1. An optical disc device configured to reproduce an optical disc, the optical disc device comprising:
    an optical pickup having a laser irradiation component that is configured to emit a laser beam to the optical disc for obtaining a return light; and
    a driver configured to generate a drive signal for driving the laser irradiation component based on a high-frequency signal,
    the driver being further configured to set an amplitude of the high-frequency signal used while reproducing a test region of the optical disc to be different from an amplitude of the high-frequency signal used while reproducing a data region of the optical disc, with the test region of the optical disc being reproduced to acquire a setting signal for a setup of the optical pickup.

2. The optical disc device according to claim 1, wherein the laser irradiation component is configured to emit the laser beam such that an output level of the laser beam is varied in multiple stages while writing to the test region of the optical disc.

3. The optical disc device according to claim 1, further comprising
    a controller configured to set an output level of the laser beam based on a reproduction signal of the setting signal for setting the output level of the laser beam.

4. The optical disc device according to claim 1, further comprising
    a position controller configured to control a position of an optical system of the optical pickup based on a control signal of the setting signal for controlling the position of the optical system of the optical pickup.

5. The optical disc device according to claim 1, wherein the driver is configured to set the amplitude of the high-frequency signal used while reproducing the test region of the optical disc to be larger than the amplitude of the high-frequency signal used while reproducing the data region of the optical disc.

6. The optical disc device according to claim 2, wherein the driver is further configured to set an amplitude of the high-frequency signal used while writing to the test region of the optical disc to be larger than the amplitude of the high-frequency signal used while reproducing the data region of the optical disc.

7. The optical disc device according to claim 6, wherein the driver is further configured to set the amplitude of the high-frequency signal used while writing to the test region of the optical disc to be 2.4 to 3.8 times the amplitude of the high-frequency signal used while reproducing the data region of the optical disc.

8. The optical disc device according to claim 1, wherein the driver is configured to generate the drive signal by superposing the high-frequency signal over a reference signal.

9. The optical disc device according to claim 1, wherein the test region of the optical disc is a different region from the data region of the optical disc.

10. An optical disc reproduction method comprising:
    generating a drive signal for driving a laser irradiation component of an optical pickup based on a high-frequency signal; and
    driving the laser irradiation component based on the drive signal such that the laser irradiation component emits a laser beam to an optical disc for obtaining a return light,
    the generating of the drive signal including setting an amplitude of the high-frequency signal used while reproducing a test region of the optical disc to be different from an amplitude of the high-frequency signal used while reproducing a data region of the optical disc, with the test region of the optical disc being reproduced to acquire a setting signal for a setup of the optical pickup.

* * * * *